US012777413B2

(12) United States Patent
Long

(10) Patent No.: US 12,777,413 B2
(45) Date of Patent: Oct. 27, 2026

(54) METHODS, NETWORK NODES AND COMPUTER READABLE MEDIA FOR SUPPORTING SET INFORMATION IN UE CONTEXT RETRIEVAL

(71) Applicant: Telefonaktiebolaget LM Ericsson (PUBL), Stockholm (SE)

(72) Inventor: Hongxia Long, Shanghai (CN)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 199 days.

(21) Appl. No.: 18/553,940

(22) PCT Filed: Apr. 7, 2022

(86) PCT No.: PCT/EP2022/059321
§ 371 (c)(1),
(2) Date: Oct. 4, 2023

(87) PCT Pub. No.: WO2022/214618
PCT Pub. Date: Oct. 13, 2022

(65) Prior Publication Data

US 2025/0324357 A1 Oct. 16, 2025

(30) Foreign Application Priority Data

Apr. 8, 2021 (WO) ................ PCT/CN2021/085976

(51) Int. Cl.
*H04W 48/18* (2009.01)
*H04W 8/08* (2009.01)
(Continued)

(52) U.S. Cl.
CPC ............. *H04W 48/18* (2013.01); *H04W 8/08* (2013.01); *H04W 60/00* (2013.01); *H04W 88/184* (2013.01)

(58) Field of Classification Search
CPC ....... H04W 48/18; H04W 8/08; H04W 60/00; H04W 88/184
See application file for complete search history.

(56) References Cited

U.S. PATENT DOCUMENTS

2015/0173035 A1* 6/2015 Schatzmayr .......... H04W 60/00 455/435.1
2021/0120462 A1* 4/2021 Chen ....................... H04W 8/02

FOREIGN PATENT DOCUMENTS

WO WO2022214618 A1 10/2022

OTHER PUBLICATIONS

Ericsson: 3GPP TSG-CT WG4 Meeting #103-e; E-Meeting, Apr. 14-24, 2021; Change Request; 29.503 CR 0629 rev—Current version: 17.2.0; Title: NF Set Support in SMSF Info (C4-212260) (Year: 2021).*

(Continued)

*Primary Examiner* — Nicholas Pachol
(74) *Attorney, Agent, or Firm* — Baker Botts L.L.P.

(57) ABSTRACT

The present disclosure provides methods (600, 700), network nodes (1000, 1100, 1200, 1300), and computer readable media for supporting set information in context retrieval. The method (600) at a first network node includes: transmitting (S601), to a second network node, a request message for a UE context of a third network node that is registered to the second network node; and receiving (S603), from the second network node, a response message at least comprising the requested UE context of the third network node and set information of a set to which the third network node belongs.

17 Claims, 11 Drawing Sheets

(51) Int. Cl.
*H04W 60/00* (2009.01)
*H04W 88/18* (2009.01)

(56) References Cited

OTHER PUBLICATIONS

3GPP TS 23.502 V17.0.0 (Mar. 2021); 3rd Generation Partnership Project; Technical Specification Group Services and System Aspects; Procedures for the 5G System (5GS); Stage 2 (Release 17) (Year: 2021).*

3GPP TS 29.503 V17.2.0 (Mar. 2021); 3rd Generation Partnership Project; Technical Specification Group Core Network and Terminals; 5G System; Unified Data Management Services; Stage 3 (Release 17) (Year: 2021).*

3GPP TS 23.501 V16.7.0 (Dec. 2020); 3rd Generation Partnership Project; Technical Specification Group Services and System Aspects; System architecture for the 5G System (5GS); Stage 2 (Release 16).

3GPP TS 23.502 V16.7.1 (Jan. 2021); 3rd Generation Partnership Project; Technical Specification Group Services and System Aspects; Procedures for the 5G System (5GS); Stage 2 (Release 16).

3GPP TS 29.503 V17.1.0 (Dec. 2020); 3rd Generation Partnership Project; Technical Specification Group Core Network and Terminals; 5G System; Unified Data Management Services; Stage 3 (Release 17).

3GPP TSG-CT WG4 Meeting #103-e; E-Meeting, Apr. 14-24, 2021; Change Request; 29.503 CR 0629 rev—Current version: 17.2.0; Title: NF Set Support in SMSF Info (C4-212260).

PCT Notification of Transmittal of the International Search Report and the Written Opinion of the International Searching Authority, or the Declaration issued for International application No. PCT/EP2022/059321—Sep. 15, 2022.

3GPP TS 23.502 V17.0.0 (Mar. 2021); 3rd Generation Partnership Project; Technical Specification Group Services and System Aspects; Procedures for the 5G System (5GS); Stage 2 (Release 17).

3GPP TS 29.503 V17.2.0 (Mar. 2021); 3rd Generation Partnership Project; Technical Specification Group Core Network and Terminals; 5G System; Unified Data Management Services; Stage 3 (Release 17).

Examination Report No. 2 for Standard Patent Application issued by the Australian Government / IP Australia for Application No. 2022255919—Jul. 31, 2025.

* cited by examiner

METHODS, NETWORK NODES AND COMPUTER READABLE MEDIA FOR SUPPORTING SET INFORMATION IN UE CONTEXT RETRIEVAL

PRIORITY

This nonprovisional application is a U.S. National Stage Filing under 35 U.S.C. § 371 of International Patent Application Serial No. PCT/EP2022/059321 filed Apr. 7, 2022 and entitled "METHODS, NETWORK NODES AND COMPUTER READABLE MEDIA FOR SUPPORTING SET INFORMATION IN UE CONTEXT RETRIEVAL," which claims priority to International Patent Application Serial No. PCT/CN2021/085976 filed Apr. 8, 2021, both of which are hereby incorporated by reference in their entirety.

TECHNICAL FIELD

The present disclosure generally relates to the technical field of communication technologies, and particularly to methods, network nodes, and computer readable media for supporting set information in User Equipment (UE) context retrieval.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

NF Set

According to Clause 5.21.3.2 of 3GPP TS 23.501 V16.7.0 (which is incorporated herein in its entirety by reference), an NF Set is defined as a group of interchangeable NF instances of the same type, supporting the same services and the same Network Slice(s), wherein the NF instances in the same NF Set may be geographically distributed but have access to the same context.

When an NF Set is deployed in the network as specified in Clauses 5.21.3 and 6.3.1.0 of 3GPP TS 23.501 V16.7.0, an NF Service Producer in an NF Set creates resource context(s) and the context(s) is shared by all the NF instances pertaining to the same NF Set, i.e. the resource context is bound to the NF Set. So, requests targeting the resource may be served by any NF Instance within the NF Set, unless the shared contexts are lost.

Registration Procedures for Short Message Service (SMS) Over Non-Access Stratum (NAS) (from 3GPP 23.502 V16.7.1, which is Incorporated Herein in its Entirety by Reference)

FIG. 1 schematically illustrates a registration procedure supporting SMS over NAS, which substantially corresponds to FIG. 4.13.3.1-1 in Clause 4.13.3.1 of 3GPP 23.502 V16.7.1, and FIG. 2 schematically illustrates a general registration procedure, which substantially corresponds to FIG. 4.2.2.2.2-1 in Clause 4.2.2.2.2 of 3GPP 23.502 V16.7.1.

As shown in FIG. 1 in conjunction with FIG. 2, the registration procedure supporting SMS over NAS includes the following steps.

1. During Registration procedure in 5G System (5GS) defined in FIG. 2, to enable SMS over NAS transporting, the User Equipment (UE) includes an "SMS supported" indication in Registration Request in steps 1-3 indicating the UE's capability for SMS over NAS transport. The "SMS supported" indication indicates whether the UE supports SMS delivery over NAS.
2. Step 4 to step 14 of the Registration procedure in FIG. 2 are performed. The Access and Mobility management Function (AMF) may retrieve the SMS Subscription data and UE Context in Short Message Service Function (SMSF) data using Nudm_SDM_Get. This requires that Unified Data Management (UDM) may retrieve this information from Unified Data Repository (UDR) by Nudr_DM_Query. The UDM includes the SMSF information in the Nudm_SDM_Get response message if the stored SMSF belongs to the same PLMN of the AMF. After a successful response is received and if SMS service is allowed, the AMF subscribes to be notified using Nudm_SDM_Subscribe when the SMS Subscription data is modified, and UDM may subscribe to UDR by Nudr_DM_Subscribe.

The AMF can also receive UE context information containing SMSF Information from old AMF. When AMF re-allocation happens during the Registration procedure, the old AMF transfers SMSF Information to the new AMF as part of UE context in step 5 of in FIG. 2.

NOTE 1: The AMF can, instead of the Nudm_SDM_Get service operation, use the Nudm_SDM_Subscribe service operation with an Immediate Report Indication that triggers the UDM to immediately return the subscribed data if the corresponding feature is supported by both the AMF and the UDM.

3. If the "SMS supported" indication is included in the Registration Request, the AMF checks in the SMS Subscription data that was received in step 2 whether the SMS service is allowed to the UE. If SMS service is allowed and the UE context received in step 2 includes an available SMSF of the serving PLMN, the AMF activates this SMSF Address and continues the registration procedure. If SMS service is allowed but an SMSF of the serving PLMN was not received in step 2, the AMF discovers and selects an SMSF to serve the UE as described in Clause 6.3.10 of 3GPP TS 23.501 V16.7.0.
4. Step 15 to step 20 of the Registration procedure in in FIG. 2 are performed.
5. The AMF invokes Nsmsf_SMService_Activate service operation from the SMSF. The invocation includes AMF address, Access Type, Radio Access Technology (RAT) Type, Trace Requirements, Generic Public Subscription Identifier (GPSI) (if available) and Subscription Permanent Identifier (SUPI). AMF uses the SMSF Information derived from step 3. Trace Requirements is provided if it has been received by AMF as part of subscription data.
6. The SMSF discovers a UDM as described in TS 23.501 V16.7.0, Clause 6.3.8.

7a. If the UE context for the current Access Type already exists in the SMSF, the SMSF shall replace the old AMF address with the new AMF address.

Otherwise, the SMSF registers with the UDM using Nudm_UECM_Registration with Access Type. As a result, the UDM stores the following information: SUPI, SMSF identity, SMSF address, Access Type in UE Context in SMSF data. The UDM may further store SMSF Information in UDR by Nudr_DM_Update (SUPI, Subscription Data, UE Context in SMSF data).

7b-7c. SMSF retrieves SMS Management Subscription data (e.g., SMS teleservice, SMS barring list) using Nudm_SDM_Get and this requires that UDM may get this information from UDR by Nudr_DM_Query (SUPI, Subscription Data, SMS Management Subscription data). After a successful response is received, the SMSF subscribes to be notified using Nudm_SDM_Subscribe when the SMS Management Subscription data is modified and UDM may subscribe to notifications from UDR by Nudr_DM_Subscribe.

SMSF also creates a UE context to store the SMS subscription information and the AMF address that is serving this UE.

NOTE 2: The SMSF can, instead of the Nudm_SDM_Get service operation, use the Nudm_SDM_Subscribe service operation with an Immediate Report Indication that triggers the UDM to immediately return the subscribed data if the corresponding feature is supported by both the SMSF and the UDM.

8. The SMSF responds back to the AMF with Nsmsf_SMService_Activate service operation response message. The AMF stores the SMSF Information received as part of the UE context.

9. The AMF includes the "SMS allowed" indication to the UE in the Registration Accept message of step 21 of FIG. 2 only after step 8 in which the AMF has received a positive indication from the selected SMSF.

The "SMS allowed" indication in the Registration Accept message indicates to the UE whether the network allows the SMS message delivery over NAS.

SMSF Registration for 3GPP Access (from 3GPP 29.503 V17.1.0, which is Incorporated Herein in its Entirety by Reference)

FIG. 3A schematically illustrates an exemplary scenario where an SMSF sends a request to a UDM to create or update SMSF registration information for 3GPP access (also see 3GPP TS 23.502 V16.7.1, Clause 4.13.3.1), which substantially corresponds to FIG. 5.3.2.2.5-1 in Clause 5.3.2.2.5 of 3GPP TS 29.503 V17.1.0.

The request contains the UE's identity (/{ueId}), which shall be an SUPI and the SMSF Registration Information for SMS service.

When a UE requests SMS service from both 3GPP access and Non-3GPP access, the SMSF shall perform separate individual SMSF registration for each access type.

As shown in FIG. 3A, the SMSF registering procedure for 3GPP access includes the following steps.

1. The SMSF sends a PUT request to the resource representing the UE's SMSF registration for 3GPP Access to update or create SMSF registration information.

If the SMSF belongs to an SMSF Set, the NF Set ID of the SMSF Set shall be included in the request message. It should be recognized that all of SMSFs (or called SMSF instances) belonging to the SMSF set can share the same context(s) served by the SMSFs.

2a. If successful, the UDM responds with "200 OK", or "201 Created" with the message body containing the representation of the SmsfRegistration.

2b. If the operation cannot be authorized due to e.g. UE does not have required subscription data, access barring or roaming restrictions, HTTP status code "403 Forbidden" should be returned including additional error information in the response body (in "ProblemDetails" element).

On failure, the appropriate HTTP status code indicating the error shall be returned and appropriate additional error information should be returned in the PUT response body.

SMSF Registration for Non 3GPP Access (from 3GPP 29.503 V17.1.0)

FIG. 3B schematically illustrates an exemplary where an SMSF sends a request to a UDM to create or update SMSF registration information for Non-3GPP access (also see 3GPP TS 23.502 V16.7.1, Clause 4.13.3.1), which substantially corresponds to FIG. 5.3.2.2.6-1 in Clause 5.3.2.2.6 of 3GPP TS 29.503 V17.1.0.

The request contains the UE's identity (/{ueId}) which shall be an SUPI and the SMSF Registration Information for SMS service.

When a UE requests SMS service from both 3GPP access and Non-3GPP access, the SMSF shall perform separate individual SMSF registration for each access type.

As shown in FIG. 3B, the SMSF registering procedure for Non-3GPP access includes the following steps.

1. The SMSF sends a PUT request to the resource representing the UE's SMSF registration for Non 3GPP Access to update or create SMSF registration information.

If the SMSF belongs to an SMSF Set, the NF Set ID of the SMSF Set shall be included in the request message.

2a. If successful, the UDM responds with "200 OK", or "201 Created" with the message body containing the representation of the SmsfRegistration.

2b. If the operation cannot be authorized due to e.g UE does not have required subscription data, access barring or roaming restrictions, HTTP status code "403 Forbidden" should be returned including additional error information in the response body (in "ProblemDetails" element).

On failure, the appropriate HTTP status code indicating the error shall be returned and appropriate additional error information should be returned in the PUT response body.

UE Context In SMSF Data Retrieval (from 3GPP TS 23.503 V17.1.0)

FIG. 4 schematically illustrates an exemplary scenario where an NF service consumer (e.g. AMF) sends a request to a UDM to receive UE's Context in SMSF data, which substantially corresponds to FIG. 5.2.2.2.12-1 in Clause 5.2.2.2.12 of 3GPP TS 23.503 V17.1.0.

The request contains the UE's identity (/{supi}), the type of the requested information (/ue-context-in-smsf-data) and query parameters (supported-features).

As shown in FIG. 4, the UE Context In SMSF Data Retrieval procedure includes the following steps.

1. The NF service consumer (e.g. AMF) shall send a GET request to the resource representing the UE's Context In SMSF Data, with query parameters indicating the supported-features.

2a. On Success, the UDM shall respond with "200 OK" with the message body containing the UE's Context In SMSF Data as relevant for the requesting NF service consumer.

2b. If there is no valid subscription data for the UE, HTTP status code "404 Not Found" shall be returned including additional error information in the response body (in the "ProblemDetails" element).

On failure, the appropriate HTTP status code indicating the error shall be returned and appropriate additional error information should be returned in the GET response body.

Table 1 shows a definition of type UeContextInSmsfData, as also specified in Clause 6.1.6.2.23 of 29.503 V17.1.0.

TABLE 1

Definition of Type UeContextInSmsfData

| Attribute name | Data type | P | Cardinality | Description |
|---|---|---|---|---|
| smsfInfo3GppAccess | SmsfInfo | O | 0 . . . 1 | SMSF Info for 3GPP Access |
| smsfInfoNon3GppAccess | SmsfInfo | O | 0 . . . 1 | SMSF Info for Non 3GPP Access |

Table 2 shows a definition of type SmsfInfo, as also specified in Clause 6.1.6.2.24 of 29.503 V17.1.0.

TABLE 2

Definition of Type SmsfInfo

| Attribute name | Data type | P | Cardinality | Description |
|---|---|---|---|---|
| smsfInstanceId | NfInstanceId | M | 1 | NF Instance Id of the SMSF |
| plmnId | PlmnId | M | 1 | PLMN Id of the SMSF |

In the registration procedure for SMS over NAS shown in FIG. 1 as previously described (also specified in Clause 4.13.3.1 of 3GPP 23.502 V16.7.1), the AMF may retrieve the SMS Subscription data and UE Context in SMSF data using Nudm_SDM_Get in step 2 of FIG. 1, and If SMS service is allowed and the UE context received in step 2 of FIG. 1 includes an available SMSF of the serving PLMN, the AMF activates this SMSF Address and continues the registration procedure in step 3 of FIG. 1.

In the SMSF registration procedure for 3GPP access and SMSF registration procedure for Non-3GPP access respectively shown in FIGS. 3A and 3B as previously described (also specified respectively in Clauses 5.3.2.2.5 and 5.3.2.2.6 of 3GPP TS 29.503 V17.1.0), if the SMSF belongs to an SMSF Set, the NF Set ID of the SMSF Set shall be included in the request message.

The SMSF Set ID may be used to select an alternative SMSF instance within the SMSF Set, in a case where a failure occurs to the registered SMSF instance.

SUMMARY

In order to at least solve the problems as described above, the embodiments of the present disclosure provide a mechanism of including set information (e.g., a Set ID) of a set (e.g., an SMSF set) to which a network node (e.g., an SMSF) belongs in a response message in reply to a request message for a UE context (e.g., UE Context In SMSF Data) of the network node (e.g., the SMSF), when the set information is also included in registration data of the network node (e.g., the SMSF).

It should be understood that the embodiments are not limited to the scenarios involving the SMSF (as an NF service producer), the AMF (as an NF service consumer) and the UDM (as another NF service producer), but may be applied to any appropriate scenario involving any appropriate NF service consumer (also called "first network node" throughout the present disclosure) and NF service producers (also called "second network node" and "third network node" throughout the present disclosure).

According to a first aspect of the present disclosure, a method performed by a first network node (i.e., an NF service consumer) is provided. The method includes: transmitting, to a second network node, a request message for a UE context of a third network node that is registered to the second network node; and receiving, from the second network node, a response message at least comprising the requested UE context of the third network node and set information of a set to which the third network node belongs.

In an exemplary embodiment, the set consists of a plurality of network nodes including the third network node, and any context is shared by the plurality of network nodes belonging to the set.

In an exemplary embodiment, the set information is received by the second network node in a registration request message of the third network node that is transmitted to the second network node.

In an exemplary embodiment, the set information indicates to the first network node that any of the plurality of network nodes belonging to the set can be used in a case where a failure occurs to the third network node.

In an exemplary embodiment, the method further includes: querying the plurality of network nodes belonging to the set based on the received set information; receiving information of the plurality of network nodes belonging to the set; and storing the information of the plurality of network nodes belonging to the set.

In an exemplary embodiment, the method further includes: selecting a network node from the plurality of network nodes belonging to the set based on the stored information of the plurality of network nodes belonging to the set, in a case where a failure occurs to the third network node.

In an exemplary embodiment, the method further includes: transmitting the received set information to a proxy for the proxy to query the plurality of network nodes belonging to the set based on the received set information, receive information of the plurality of network nodes belonging to the set, store the information of the plurality of network nodes belonging to the set, and select a network node from the plurality of network nodes belonging to the set based on the stored information of the plurality of network nodes belonging to the set, in a case where a failure occurs to the third network node.

In an exemplary embodiment, the first network node acts as a NF service consumer, the second network node acts as a corresponding NF service producer, and the third network node acts as another corresponding NF service producer.

In an exemplary embodiment, the first network node is an AMF or an SCP, the second network node is a UDM, and the third network node is an SMSF.

In an exemplary embodiment, the request message is an HTTP Get request message for UE-Context-In-SMSF Data, and the response message is a "200 OK" message comprising the UE-Context-In-SMSF Data, SMSF set information to which the SMSF belongs, and information of the SMSF.

According to a second aspect of the present disclosure, a method performed by a second network node (i.e., an NF service producer) is provided. The method includes: receiving, from a first network node, a request message for a UE context of a third network node that is registered to the second network node; and transmitting, to the first network node, a response message at least comprising the requested UE context of the third network node and set information of a set to which the third network node belongs.

In an exemplary embodiment, the set consists of a plurality of network nodes including the third network node, and any context is shared by the plurality of network nodes belonging to the set.

In an exemplary embodiment, the method further includes: receiving, from the third network node, a registration request message for registering the third network node to the second network node, wherein the set information of the set to which the third network node belongs is comprised in the received registration request message.

In an exemplary embodiment, the set information indicates to the first network node that any of the plurality of network nodes belonging to the set can be used in a case where a failure occurs to the third network node.

In an exemplary embodiment, the first network node acts as a NF service consumer, the second network node acts as a corresponding NF service producer, and the third network node acts as another corresponding NF service producer.

In an exemplary embodiment, the first network node is an AMF or an SCP, the second network node is a UDM, and the third network node is an SMSF.

In an exemplary embodiment, the request message is an HTTP Get request message for UE-Context-In-SMSF Data, and the response message is a "200 OK" message comprising the UE-Context-In-SMSF Data, SMSF set information to which the SMSF belongs, and information of the SMSF.

According to a third aspect of the present disclosure, a first network node is provided. The first network node includes: at least one processor, and at least one memory, storing instructions which, when executed on the at least one processor, cause the first network node to perform any of the methods according to the first aspect of the present disclosure.

According to a fourth aspect of the present disclosure, a second network node is provided. The second network node includes: at least one processor, and at least one memory, storing instructions which, when executed on the at least one processor, cause the second network node to perform any of the methods according to the second aspect of the present disclosure.

According to a fifth aspect of the present disclosure, a computer readable storage medium is provided. The computer readable storage medium has computer program instructions stored thereon, the computer program instructions, when executed by at least one processor, causing the at least one processor to perform the method according to any of the first and second aspects of the present disclosure.

The technical solutions of the embodiments of the present disclosure may optimize 3GPP signaling with the set information supported in UE-Context-In-SMSF data retrieval. In particular, the technical solutions of the embodiments of the present disclosure may

- avoid additional signaling for the first network node in direct communication or for SCP in indirect communication to select an alternative third network node (instance) in the case where a failure occurs to the registered third network node; and
- explicitly indicate that a set shall be used for redundancy and scalability.

BRIEF DESCRIPTION OF THE DRAWINGS

The objects, advantages and characteristics of the present disclosure will be more apparent, according to descriptions of preferred embodiments in connection with the drawings, in which.

Figure 1:
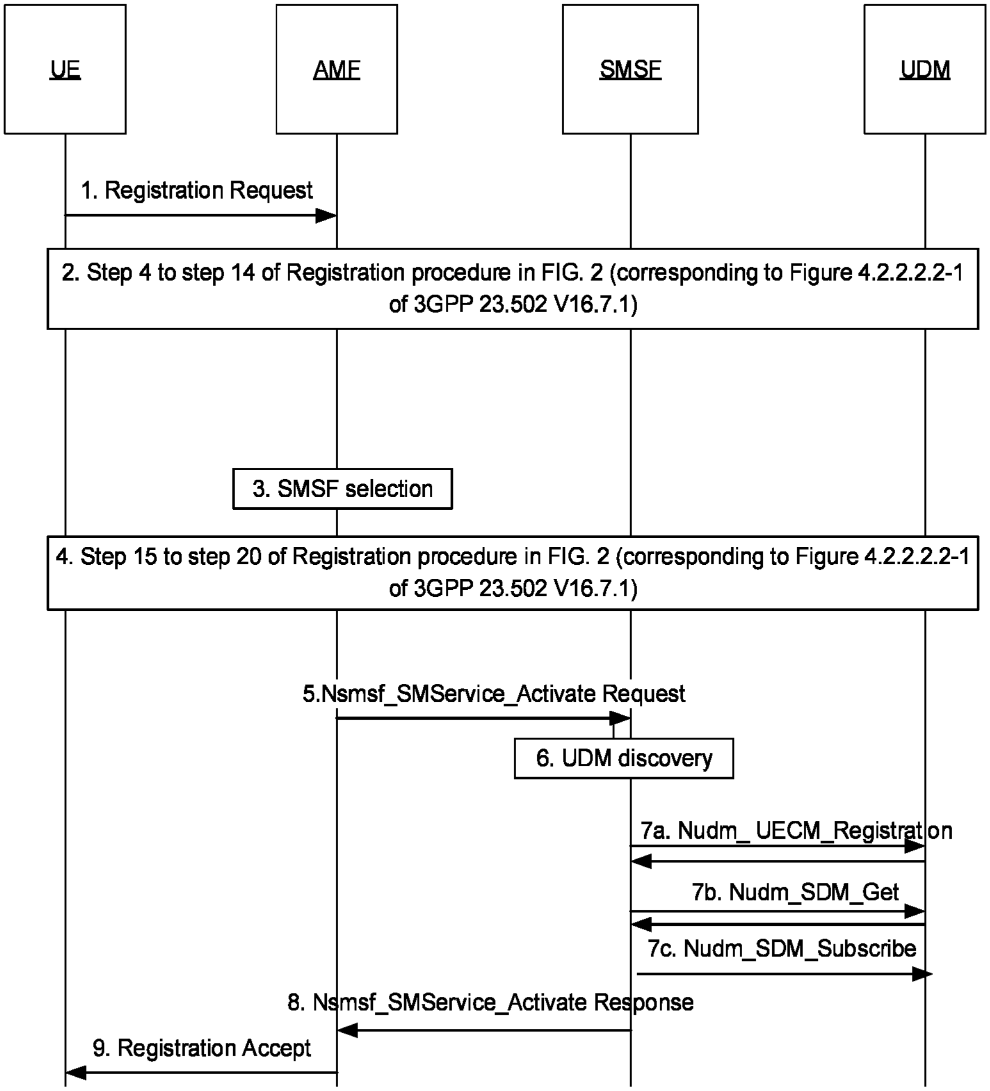
FIG. 1 schematically illustrates a registration procedure supporting SMS over NAS.

It should be noted that throughout the drawings, same or similar reference numbers are used for indicating same or similar elements; various parts in the drawings are not drawn to scale, but only for an illustrative purpose, and thus should not be understood as any limitations and constraints on the scope of the present disclosure.

DETAILED DESCRIPTION

Figure 4:
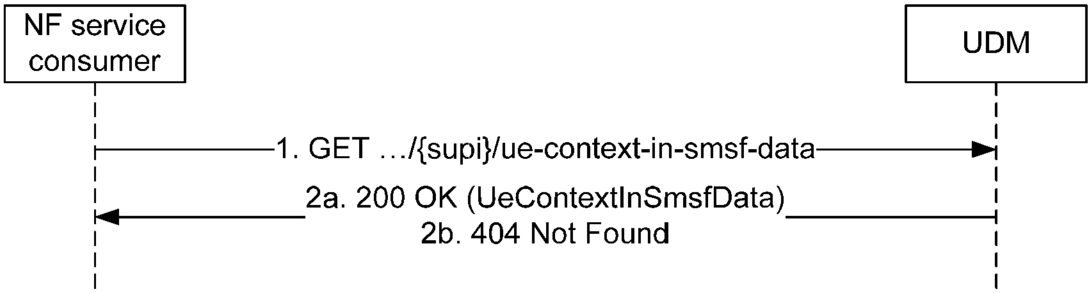
FIG. 4 schematically illustrates an exemplary scenario where an NF service consumer (e.g. AMF) sends a request to a UDM to receive UE's Context in SMSF data.

For the UE Context In SMSF Data Retrieval procedure as described in conjunction with FIG. 4, the SMSF Set ID needs to be additionally queried when a failure occurs to the registered SMSF instance, which leads to additional signaling e.g. for the AMF in direct communication or e.g. for Service Communication Proxy (SCP) in indirect communication to select an alternative SMSF instance in the case where a failure occurs to the registered SMSF instance.

Also, it is unclear whether to use the SMSF set for redundancy and scalability. Certain embodiments described herein, aim to address these problems.

Hereinafter, the principle and spirit of the present disclosure will be described with reference to illustrative embodiments. Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided byway of example to convey the scope of the subject matter to those skilled in the art.

Those skilled in the art will appreciate that the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be liming of exemplary embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the term "and/or" includes any and all combinations of one or more of the associated listed terms.

In the following description and claims, unless defined otherwise, all technical and scientific terms used herein have the same meaning as commonly understood by one of ordinary skills in the art to which this disclosure belongs.

As used herein, the term "network" refers to a network following any suitable (wireless or wired) communication standards. For example, the wireless communication standards may include new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably.

Furthermore, the communications between two devices in the network may be performed according to any suitable communication protocols, including, but not limited to, the wireless communication protocols as defined by a standard organization such as 3GPP or the wired communication protocols. For example, the wireless communication protocols may include the first generation (1G), 2G, 3G, 4G, 4.5G, 5G communication protocols, and/or any other protocols either currently known or to be developed in the future.

As used herein, the term "network node" refers to a device in a wireless communication network via which a terminal device or another network node accesses the network and receives services therefrom. The network node refers to an NF, a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network node may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network node may represent any suitable device (or group of devices) capable, configured, arranged, and/or operable to enable and/or provide a terminal device access to the wireless communication network or to provide some service to a terminal device that has accessed the wireless communication network.

The term "UE" refers to any end device that can access a wireless communication network and receive services therefrom. By way of example and not limitation, the UE refers to a mobile terminal, terminal device, or other suitable devices. The UE may be, for example, a SS (Subscriber Station), a Portable Subscriber Station, a MS (Mobile Station), or an AT (Access Terminal), a relay node. The UE may include, but not limited to, portable computers, image capture terminal devices such as digital cameras, gaming terminal devices, music storage and playback appliances, a mobile phone, a cellular phone, a smart phone, VoIP (voice over IP) phones, wireless local loop phones, a tablet, a wearable device, a PDA (personal digital assistant), portable computers, desktop computer, image capture terminal devices such as digital cameras, gaming terminal devices, music storage and playback appliances, wearable terminal devices, vehicle-mounted wireless terminal devices, wireless endpoints, mobile stations, LEE (laptop-embedded equipment), LME (laptop-mounted equipment), USB dongles, smart devices, wireless CPE (customer-premises equipment) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an IoT (Internet of Things) scenario, a UE may represent a machine or other device that performs monitoring and/or measurements, and transmits the results of such monitoring and/or measurements to another terminal device and/or network equipment. The UE may in this case be a M2M (machine-to-machine) device, which may in a 3GPP context be referred to as a MTC device. As one particular example, the UE may be a terminal device implementing the 3GPP NB-IoT standard. Particular examples of such machines or devices are sensors, metering devices such as power meters, industrial machinery, or home or personal appliances, for example refrigerators, televisions, personal wearables such as watches etc. In other scenarios, a UE may represent a vehicle or other equipment that is capable of monitoring and/or reporting on its operational status or other functions associated with its operation.

The basic idea of the present disclosure mainly consists in that if set information (e.g., a Set ID) of a set (e.g., an SMSF set) to which the third network node (e.g., an SMSF, also called an SMSF instance, same below) belongs is provided in a registration procedure of the third network node (e.g., the SMSF) to the second network node (e.g., an UDM), when the second network node (e.g., the UDM) responds with a context (e.g., UE Context In SMSF Data) provided by the third network node (e.g., the SMSF) in reply to a request message of the first network node (e.g., an AMF) for the context, the set information (e.g., the Set ID) of the set (e.g., the SMSF set) to which third network node (e.g., the SMSF) belongs is returned to the first network node (e.g., the AMF) from the second network node (e.g., the UDM).

As such, in direct communication, the first network node (e.g., the AMF) may use the set information (e.g., the Set ID) of the set (e.g., the SMSF set) to which the third network node (e.g., the SMSF) belongs to select an alternative network node (e.g., an alternative SMSF, also called an alternative SMSF instance) within the set, if the registered third network node (e.g., the registered SMSF) fails.

Figure 5:
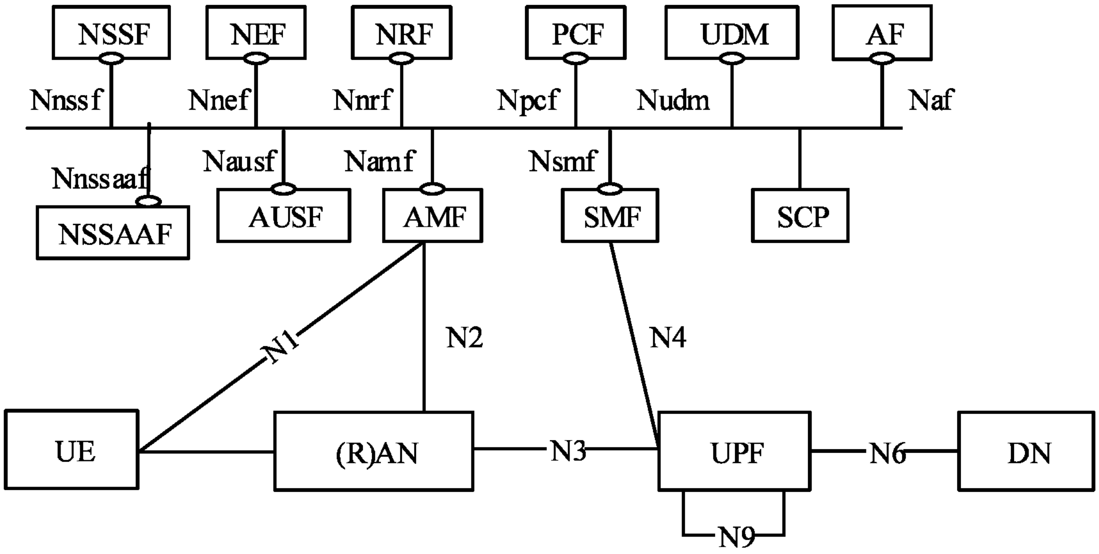
FIG. 5 schematically shows an exemplary 5GS architecture.

Alternatively, as shown in FIG. 5, if an SCP is deployed, it may be used for indirect communication between network nodes (i.e., NFs) and NF services as described in 3GPP TS 23.501 V16.7.0, Annex E. The SCP does not expose services itself. In this case, in indirect communication with the SCP deployed, the first network node (e.g., the AMF) may transmit the set information (e.g., the Set ID) of the set (e.g., the SMSF set) to which third network node (e.g., the SMSF) belongs to the SCP, so that the SCP may use the set information to select an alternative network node within the set, if the registered third network node (e.g., the registered SMSF) fails.

Hereinafter, a method 600 at a first network node for supporting set information in UE context retrieval according to an exemplary embodiment of the present disclosure will be described with reference to FIG. 6. It should be understood that the first network node may act as an NF service consumer, or similar in other future developments, that transmits a request message, e.g., an HTTP request message.

Figure 6:
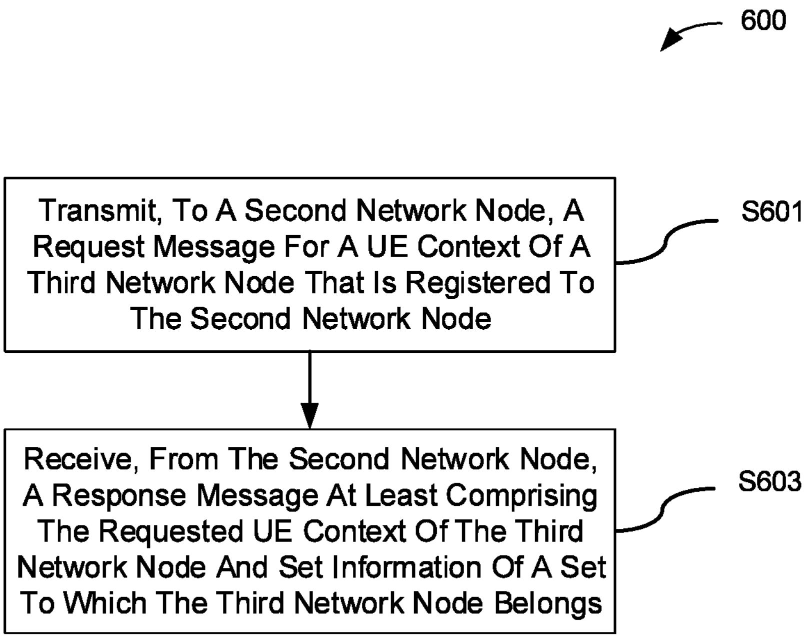
FIG. 6 schematically shows a method performed by a first network node for supporting set information in context retrieval according to an exemplary embodiment of the present disclosure.

As shown in FIG. 6, the method 600 may include at least steps S601 and S603.

In step S601, the first network node may transmit, to a second network node, a request message for a UE context of a third network node that is registered to the second network node.

Here, both the second network node and the third network node may act as corresponding NF service producers for the first network node, or similar in other future developments in any appropriate scenarios, which may provide services to be consumed by the first network node (as the NF service consumer).

When the third network node registers with the second network node, set information of a set to which the third network node belongs is provided in a registration request message of the third network node to the second network node.

As previously described, the set consists of a plurality of network nodes including the third network node, and any context is shared by the plurality of network nodes belonging to the set.

Thus, in response to the request message for the UE context of the registered third network node, the second network node may include the set information in the corresponding response message, besides the requested UE context.

Accordingly in step S603, the first network node may receive, from the second network node, the response message at least including the requested UE context of the third network node and the set information of the set to which the third network node belongs.

The set information may implicitly indicate to the first network node that any of the plurality of network nodes belonging to the set can be used in a case where a failure occurs to the third network node.

In an exemplary embodiment, the first network node may query, e.g., from a Network Repository Function 'NRF', the plurality of network nodes belonging to the set based on the received set information. Alternatively, the querying of the first network node may be performed in a case where a failure occurs to the third network node.

Then, the first network node may receive information of the plurality of network nodes belonging to the set; and store the information of the plurality of network nodes belonging to the set.

As such, the first network node may select a network node from the plurality of network nodes belonging to the set based on the stored information of the plurality of network nodes belonging to the set in the case where a failure occurs to the third network node.

In an example, the first network node may be an AMF or an SCP, the second network node may be a UDM, and the third network node may be an SMSF.

In this example, the request message may be an HTTP Get request message for UE-Context-In-SMSF Data, and the response message may be a "200 OK" message comprising the UE-Context-In-SMSF Data, SMSF set information to which the SMSF belongs, and information of the SMSF.

In particular, the HTTP Get request message for UE-Context-In-SMSF Data may be Nudm_SDM_GET (ue-context-in-smsf-data), and the "200 OK" message may be 200 OK (ue-context-in-smsf-data with SMSF Set ID). In this case, the AMF retrieve ue-context-in-smsf-data via its own URI.

Alternatively, the HTTP Get request message for UE-Context-In-SMSF Data may be Nudm_SDM_GET (dataset-name=UEC_SMSF), and the "200 OK" message may be 200 OK (SubscriptionDataSets with SMSF Set Id Included for ue-context-in-smsf-data). In this case, the AMF retrieve ue-context-in-smsf-data via multiple dataset URI but with UEC_SMSF included in dataset-names query parameter.

In another exemplary embodiment, the first network node (e.g., AMF) may transmit the received set information to a proxy (e.g., SCP) for the proxy to query the plurality of network nodes belonging to the set based on the received set information, receive information of the plurality of network nodes belonging to the set, store the information of the plurality of network nodes belonging to the set, and select a network node from the plurality of network nodes belonging to the set based on the stored information of the plurality of network nodes belonging to the set, in a case where a failure occurs to the third network node.

It should be understood that the embodiments are not limited to the scenarios involving the SMSF (as an NF service producer), the AMF (as an NF service consumer) and the UDM (as another NF service producer), but may be applied to any appropriate scenario involving any appropriate NF service consumer (also called "first network node" throughout the present disclosure) and NF service producers (also called "second network node" and "third network node" throughout the present disclosure).

Hereinafter, a method 700 at a second network node for supporting set information in UE context retrieval according to an exemplary embodiment of the present disclosure will be described with reference to FIG. 7. As previously described, the second network node may act as an NF service producer for the first network node (as an NF service consumer), or similar in other future developments in any appropriate scenarios, which may provide services to be consumed by the first network node.

It should also be understood that the method 700 at the second network node corresponds to the method 600 at the first network node as previously described. Thus, some description of the method 700 may refer to that of method 600, and thus will be omitted for simplicity.

As previously described, the second network node may receive, from a third network node, a registration request message for registering the third network node to the second network node, wherein the set information of the set to which the third network node belongs is included in the received registration request message.

The set consists of a plurality of network nodes including the third network node, and any context is shared by the plurality of network nodes belonging to the set.

In step S701, the second network node may receive, from a first network node, a request message for a UE context of the third network node that is registered to the second network node.

In response to the request message for the UE context of the registered third network node, the second network node may include the set information in the corresponding response message, besides the requested UE context.

Then in step S703, the second network node may transmit, to the first network node, the response message at least including the requested UE context of the third network node and the set information of the set to which the third network node belongs.

The set information may implicitly indicate to the first network node that any of the plurality of network nodes belonging to the set can be used in a case where a failure occurs to the third network node.

In an example, the first network node may be an AMF or an SCP, the second network node may be a UDM, and the third network node may be an SMSF. In this example, the request message may be an HTTP Get request message for UE-Context-In-SMSF Data, and the response message may be a "200 OK" message comprising the UE-Context-In-SMSF Data, SMSF set information to which the SMSF belongs, and information of the SMSF.

Figure 7:
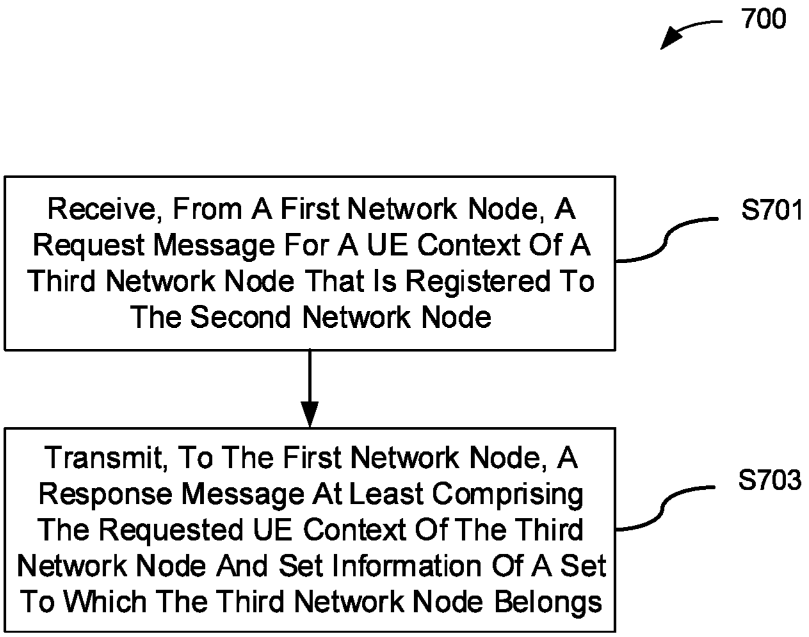
FIG. 7 schematically shows a method performed by a second network node for supporting set information in context retrieval according to an exemplary embodiment of the present disclosure.
Figure 8A:
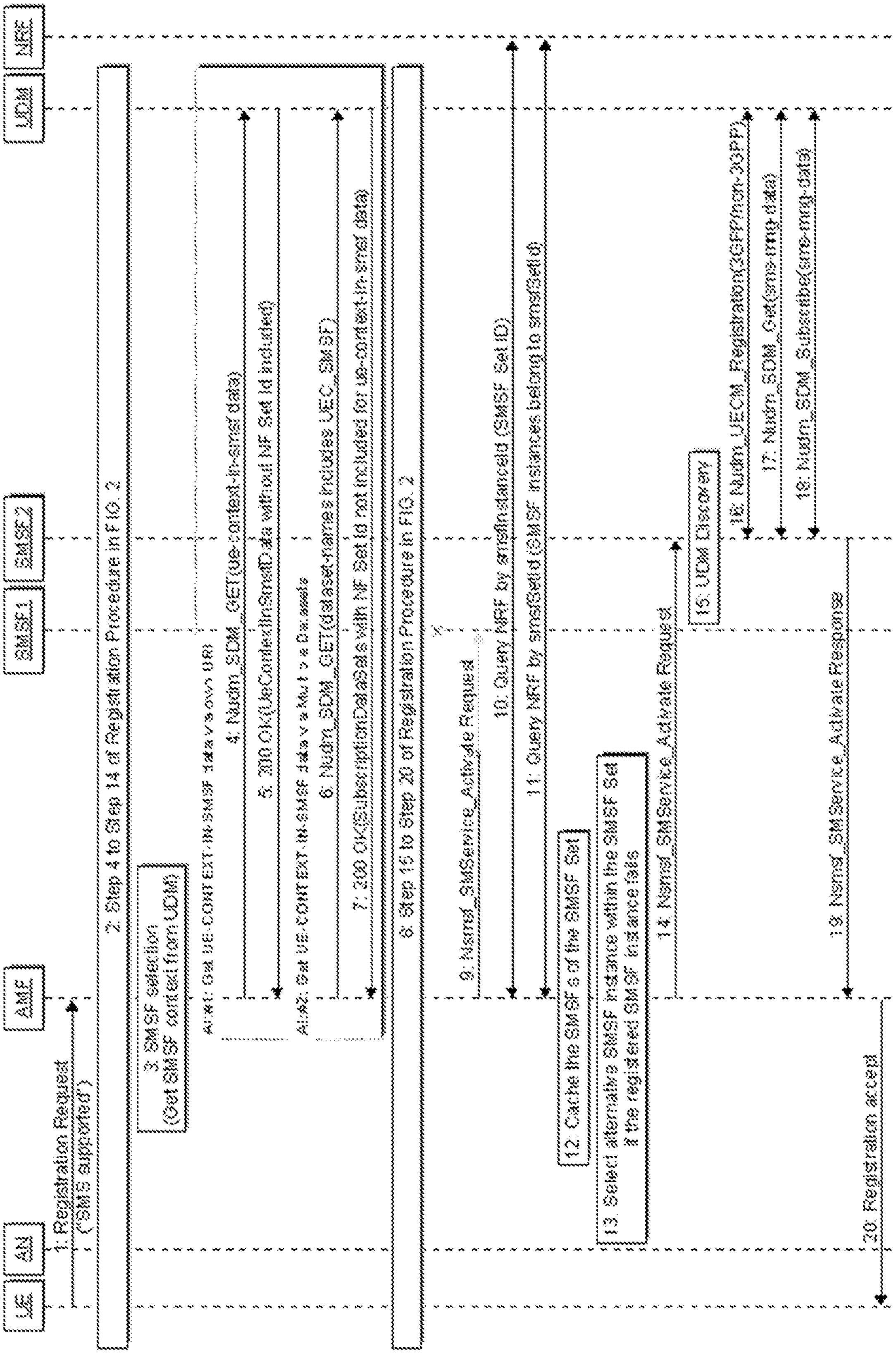
FIG. 8A schematically shows an exemplary signaling sequence of a conventional SMS registration procedure.
Figure 8B:
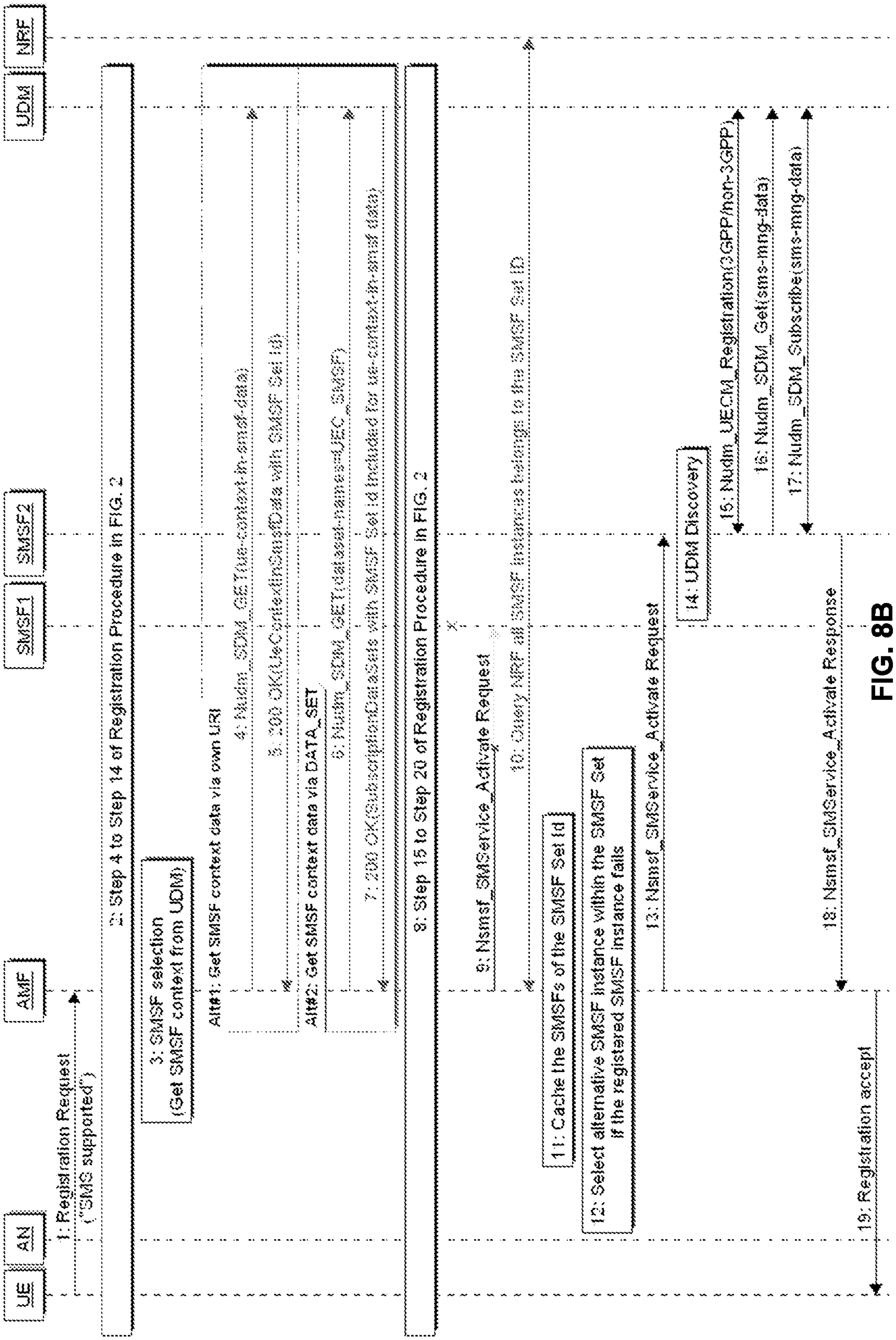
FIG. 8B schematically shows an exemplary signaling sequence in an exemplary SMS registration scenario where the methods of FIGS. 6 and 7 according to the exemplary embodiment of the present disclosure are applied in the exemplary SMS registration procedure.

Hereinafter, an exemplary signaling sequence diagram in an exemplary SMS registration scenario where the methods 600 and 700 of FIGS. 6 and 7 according to the exemplary embodiment of the present disclosure are applied in the exemplary SMS registration procedure will be described with reference to FIG. 8B, compared to an exemplary signaling sequence of a conventional SMS registration procedure as shown in FIG. 8A.

It should be understood that although this exemplary scenario to which the methods 600 and 700 according to the embodiments of the present disclosure are applied involves the SMSF (as an NF service producer, which is an example of the third network node as previously described), the AMF (as an NF service consumer, which is an example of the first network node as previously described) and the UDM (as another NF service producer, which is an example of the second network node as previously described), the present disclosure is not limited to this. Any appropriate scenarios involving any appropriate NF service consumer (also called "first network node") and NF service producers (also called "second network node" and "third network node") are possible.

FIG. 8A schematically shows an exemplary signaling sequence of a conventional SMS registration procedure without the methods 600 and 700 according to the embodiments of the present disclosure being applied (just for comparison with FIG. 8B in which the methods 600 and 700 according to the embodiments of the present disclosure are applied).

The conventional SMS registration procedure as shown in FIG. 8A may include the following steps.

Figure 2:
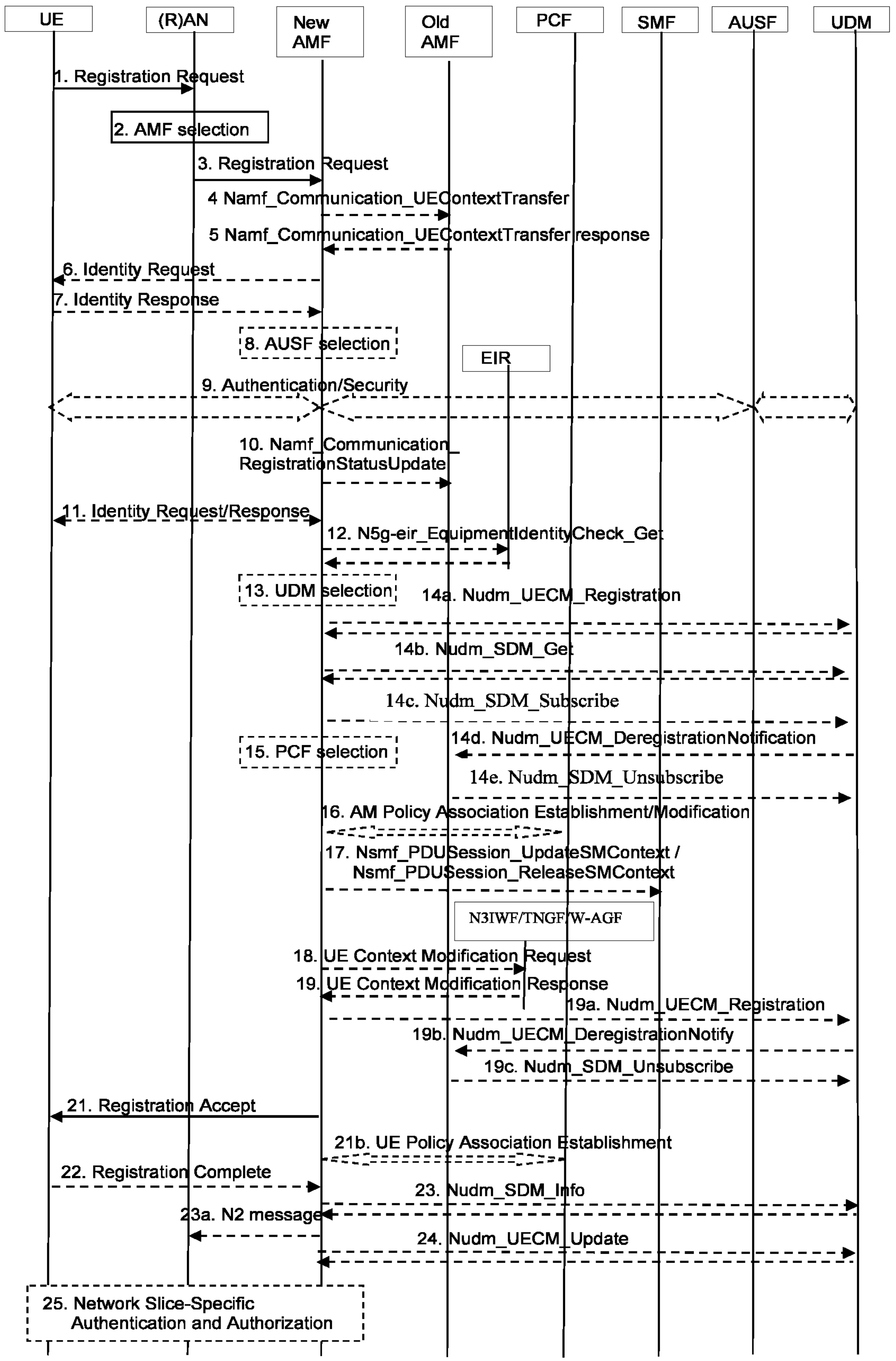
FIG. 2 schematically illustrates a general registration procedure.
Figure 3A:
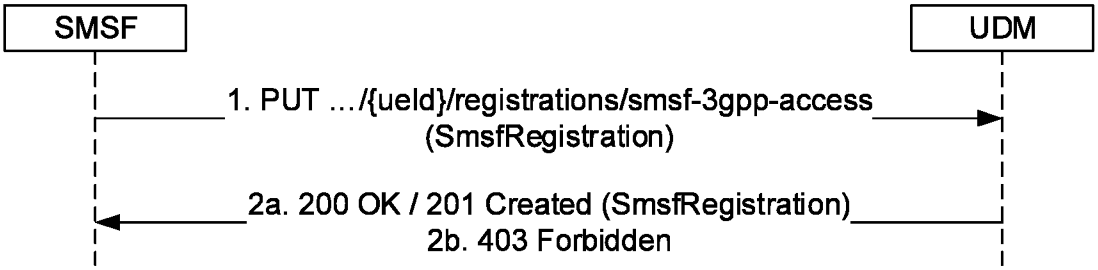
FIG. 3A schematically illustrates an exemplary scenario where an SMSF sends a request to a UDM to create or update SMSF registration information for 3GPP access.
Figure 3B:
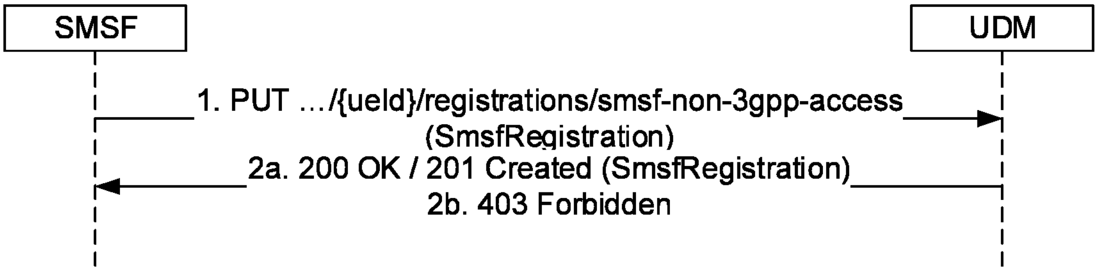
FIG. 3B schematically illustrates an exemplary where an SMSF sends a request to a UDM to create or update SMSF registration information for Non-3GPP access.

1. During Registration procedure in 5GS defined in FIG. 2 to enable SMS over NAS transporting, the UE includes an "SMS supported" indication in Registration Request in steps 1-3 indicating the UE's capability for SMS over NAS transport. The "SMS supported" indication indicates whether the UE supports SMS delivery over NAS.
2. Step 4 to step 14 of the Registration procedure in FIG. 2 are performed. The AMF may retrieve the SMS Subscription data and UE Context in SMSF data using Nudm_SDM_Get. This requires that UDM may retrieve this information from UDR by Nudr_DM_Query.
3. During SMSF selection, the AMF gets SMSF context from UDM. There are two alternatives for the AMF to retrieve the UE-Context-In-SMSF data from the UDM.

4. In Alt #1, the AMF may retrieve UE-Context-In-SMSF data via its own URI as depicted previously in conjunction with FIG. 4.
5. Without the methods 600 and 700 according to the embodiments of the present disclosure enabled or as prior art, the UDM sends the UE-Context-In-SMSF data with SMSF instance ID but without the SMSF Set ID. For illustration, SMSF1 is the current registered SMSF instance in FIG. 8A.
6. In Alt #2, the AMF may retrieve UE-Context-In-SMSF data via multiple dataset URI but with UEC_SMSF included in dataset-names query parameter.
7. Without the methods 600 and 700 according to the embodiments of the present disclosure enabled or as prior art, the UDM sends the subscription data sets without SMSF Set ID included for UE-Context-In-SMSF data beside the SMSF instance ID. For illustration, SMSF1 is the current registered SMSF instance in FIG. 8A.
8. Step 15 to step 20 of the Registration procedure in FIG. 2 are performed.
9. The AMF invokes Nsmsf_SMService_Activate service operation from the SMSF1, but the registered SMSF instance (SMSF1) fails to respond.
10. The AMF may query from the NRF by the SMSF instance ID got in step 5/7, and the NRF may send back the response for the NF profile of the SMSF instance, the SMSF Set ID of the SMSF Set that the SMSF instance (SMSF1) belongs to could be included.
11. The AMF may query from the NRF to get all SMSF instances belonging to the SMSF Set whose SMSF Set ID is got in step 10.
12. The AMF caches the available SMSF instances of the SMSF set.
13. The AMF selects an alternative SMSF instance (for illustration, SMSF2 is the selected alternative SMSF instance in FIG. 8A) within the SMSF Set whose SMSF Set ID is got in step 11, if the registered SMSF instance (SMSF1) fails.
14. The AMF invokes Nsmsf_SMService_Activate service operation from the SMSF2.
15. The SMSF2 discovers a UDM as described in 3GPP TS 23.501 V16.7.0, Clause 6.3.8.
16. The SMSF2 registers with the UDM using Nudm_UECM_Registration with Access Type. As a result, the UDM stores UE Context in SMSF data (SMSF2). The UDM may further store SMSF Information in UDR by Nudr_DM_Update (SUPI, Subscription Data, UE Context in SMSF data).
17. The SMSF2 retrieves SMS Management Subscription data (e.g., SMS teleservice, SMS barring list) using Nudm_SDM_Get and this requires that the UDM may get this information from UDR by Nudr_DM_Query (SUPI, Subscription Data, SMS Management Subscription data).
18. After a successful response is received, the SMSF2 subscribes to be notified using Nudm_SDM_Subscribe when the SMS Management Subscription data is modified and UDM may subscribe to notifications from UDR by Nudr_DM_Subscribe. The SMSF2 also creates a UE context to store the SMS subscription information and the AMF address that is serving this UE.
19. The SMSF2 responds back to the AMF with Nsmsf_SMService_Activate service operation response message. The AMF stores the SMSF2 Information received as part of the UE context.
20. The AMF includes the "SMS allowed" indication to the UE in the Registration Accept message of step 21 of FIG. 2 only after step 8 in which the AMF has received a positive indication from the selected SMSF2. The "SMS allowed" indication in the Registration Accept message indicates to the UE whether the network allows the SMS message delivery over NAS.

FIG. 8B schematically shows an exemplary signaling sequence in an exemplary SMS registration scenario where the methods of FIGS. 6 and 7 according to the exemplary embodiment of the present disclosure are applied in the exemplary SMS registration procedure.

The exemplary SMS registration procedure as shown in FIG. 8B in which the methods of FIGS. 6 and 7 according to the exemplary embodiment of the present disclosure are applied may include the following steps.

1. During Registration procedure in 5GS defined in FIG. 2 to enable SMS over NAS transporting, the UE includes an "SMS supported" indication in Registration Request in steps 1-3 indicating the UE's capability for SMS over NAS transport. The "SMS supported" indication indicates whether the UE supports SMS delivery over NAS.
2. Step 4 to step 14 of the Registration procedure in FIG. 2 are performed. The AMF may retrieve the SMS Subscription data and UE Context in SMSF data using Nudm_SDM_Get. This requires that UDM may retrieve this information from UDR by Nudr_DM_Query.
3. During SMSF selection, the AMF gets SMSF context from the UDM. There are two alternatives for AMF to retrieve the UE-Context-In-SMSF data from UDM.
4. In Alt #1, the AMF may retrieve UE-Context-In-SMSF data via its own URI as depicted previously in conjunction with FIG. 4.
5. With the methods 600 and 700 according to the embodiments of the present disclosure enabled, the UDM sends the UE-Context-In-SMSF data with SMSF Set ID besides SMSF instance ID. For illustration, SMSF1 is the current registered SMSF instance in FIG. 8B.
6. In Alt #2, the AMF may retrieve UE-Context-In-SMSF data via multiple dataset URI but with UEC_SMSF included in dataset-names query parameter.
7. With the methods 600 and 700 according to the embodiments of the present disclosure enabled, the UDM sends the subscription data sets with SMSF Set ID included for UE-Context-In-SMSF data beside the SMSF instance ID. For illustration, SMSF1 is the current registered SMSF instance in FIG. 8B.

The difference of the signaling sequence diagram in FIG. 8B from that in FIG. 8A is that the UDM returns the SMSF Set ID. This is not supported by the current 3GPP standards.

In an exemplary embodiment, the definition of Type: SmsfInfo as specified in Clause 6.1.6.2.24 of 29.503 V17.1.0 may be changed from Table 2 to Table 3 below. The changed part is shown 'Underlined'.

TABLE 3

Definition of Type SmsfInfo Proposed In Present Disclosure

| Attribute name | Data type | P | Cardinality | Description |
|---|---|---|---|---|
| smsfInstanceId | NfInstanceId | M | 1 | NF Instance Id of the SMSF |
| plmnId | PlmnId | M | 1 | PLMN Id of the SMSF |
| smsfSetId | NfSetId | C | 0 . . . 1 | NF Set Id of SMSF Set the registered SMSF instance belongs to, shall be present if provided in SMSF registration procedure (see clauses 5.3.2.2.5 and 5.3.2.2.6 of 3GPP TS 29.503 V17.1.0) |

Accordingly, the corresponding Nudm_SDM API may be adapted as follows, wherein the changed part is shown 'Underlined'.

A.2 Nudm_SDM API

```
openapi: 3.0.0
info:
  version: '2.2.0-alpha.2'
  title: 'Nudm_SDM'
  description: |
    Nudm Subscriber Data Management Service.
    © 2020, 3GPP Organizational Partners (ARIB, ATIS, CCSA, ETSI,
TSDSI, TTA, TTC).
    All rights reserved.
externalDocs:
  description: 3GPP TS 29.503 Unified Data Management Services,
version 17.1.0
  url: 'http://www.3gpp.org/ftp/Specs/archive/29_series/29.503/'
(... text not shown for clarity ...)
    UeContextInSmsfData:
      type: object
      properties:
        smsfInfo3GppAccess:
          $ref: '#/components/schemas/SmsfInfo'
        smsfInfoNon3GppAccess:
          $ref: '#/components/schemas/SmsfInfo'
    SmsfInfo:
      type: object
      required:
        - smsfInstanceId
        - plmnId
      properties:
        smsfInstanceId:
          $ref:
'TS29571_CommonData.yaml#/components/schemas/NfInstanceId'
        plmnId:
          $ref:
'TS29571_CommonData.yaml#/components/schemas/PlmnId'
        smsfSetId:
          $ref:
'TS29571 CommonData.yaml#/components/schemas/NfSetId'
(... text not shown for clarity ...)
```

With the methods 600 and 700 according to the embodiments of the present disclosure enabled, step 10 in FIG. 8A is saved to avoid additional signaling.

8. Step 15 to step 20 of the Registration procedure in FIG. 2 are performed.
9. The AMF invokes Nsmsf_SMService_Activate service operation from the SMSF1, but the registered SMSF instance (SMSF1) fails to respond.
10. The AMF may query from the NRF all the SMSF instances belonging to the SMSF Set whose SMSF Set ID is got in step 5/7, and the NRF may send back the response for the NF profiles of all the SMSF instances.
11. The AMF caches the available SMSF instances of the SMSF set.
12. The AMF selects an alternative SMSF instance (for illustration, SMSF2 is the selected alternative SMSF instance in FIG. 8B) within the SMSF Set whose SMSF Set ID is got in step 11, if the registered SMSF instance (SMSF1) fails.
13. The AMF invokes Nsmsf_SMService_Activate service operation from the SMSF2.
14. The SMSF2 discovers a UDM as described in 3GPP TS 23.501 V16.7.0, Clause 6.3.8.
15. The SMSF2 registers with the UDM using Nudm_UECM_Registration with Access Type. As a result, the UDM stores UE Context in SMSF data (SMSF2). The UDM may further store SMSF Information in UDR by Nudr_DM_Update (SUPI, Subscription Data, UE Context in SMSF data).
16. The SMSF2 retrieves SMS Management Subscription data (e.g., SMS teleservice, SMS barring list) using Nudm_SDM_Get and this requires that UDM may get this information from UDR by Nudr_DM_Query (SUPI, Subscription Data, SMS Management Subscription data).
17. After a successful response is received, the SMSF2 subscribes to be notified using Nudm_SDM_Subscribe when the SMS Management Subscription data is modified and UDM may subscribe to notifications from UDR by Nudr_DM_Subscribe. The SMSF2 also creates a UE context to store the SMS subscription information and the AMF address that is serving this UE.
18. The SMSF2 responds back to the AMF with Nsmsf_SMService_Activate service operation response message. The AMF stores the SMSF2 Information received as part of the UE context.
19. The AMF includes the "SMS allowed" indication to the UE in the Registration Accept message of step 21 of FIG. 2 only after step 8 in which the AMF has received a positive indication from the selected SMSF2. The "SMS allowed" indication in the Registration Accept message indicates to the UE whether the network allows the SMS message delivery over NAS.

Figure 9A:
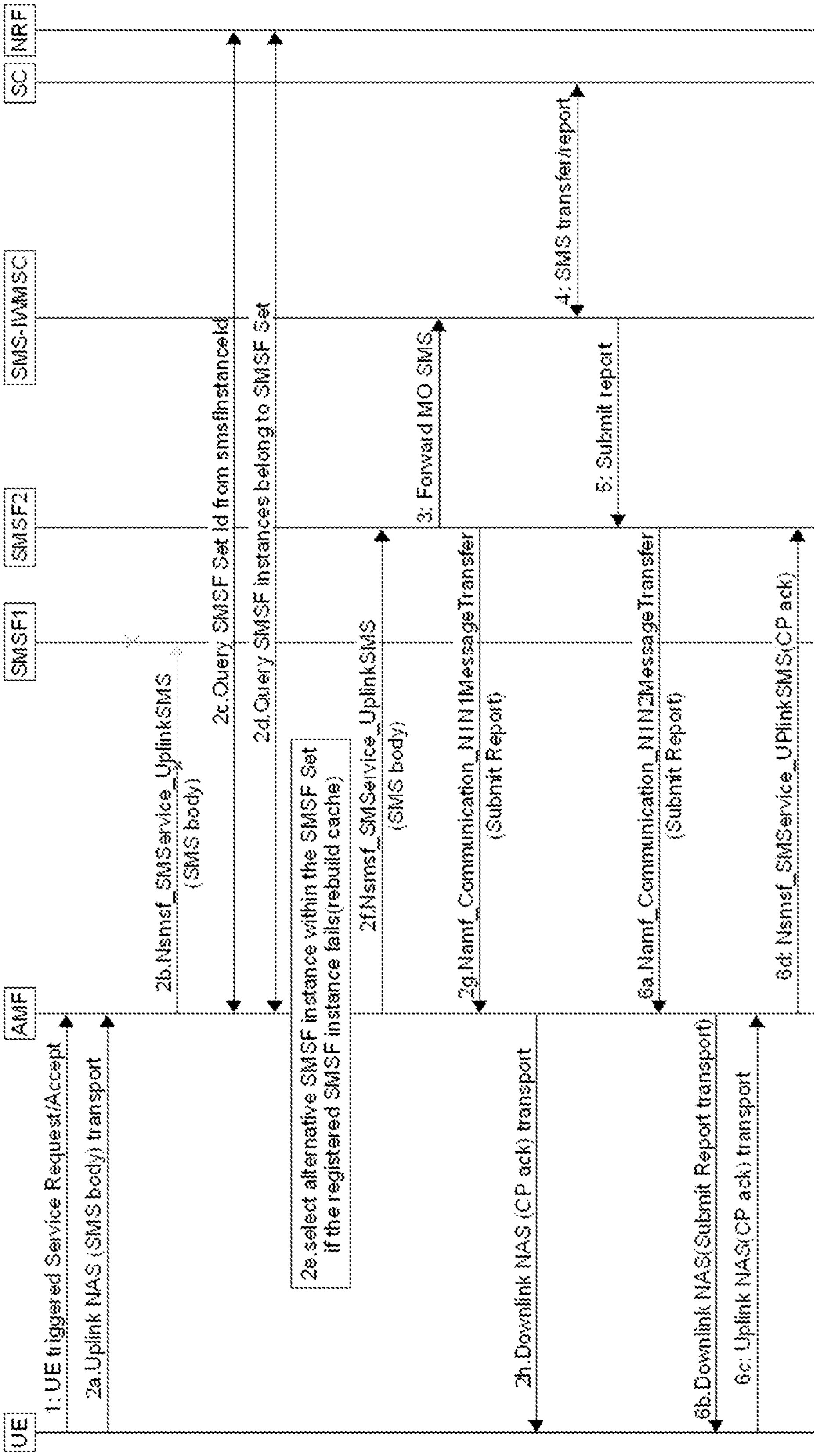
FIG. 9A schematically shows an exemplary signaling sequence of a conventional Mobile Originated (MO)-SMS procedure.
Figure 9B:
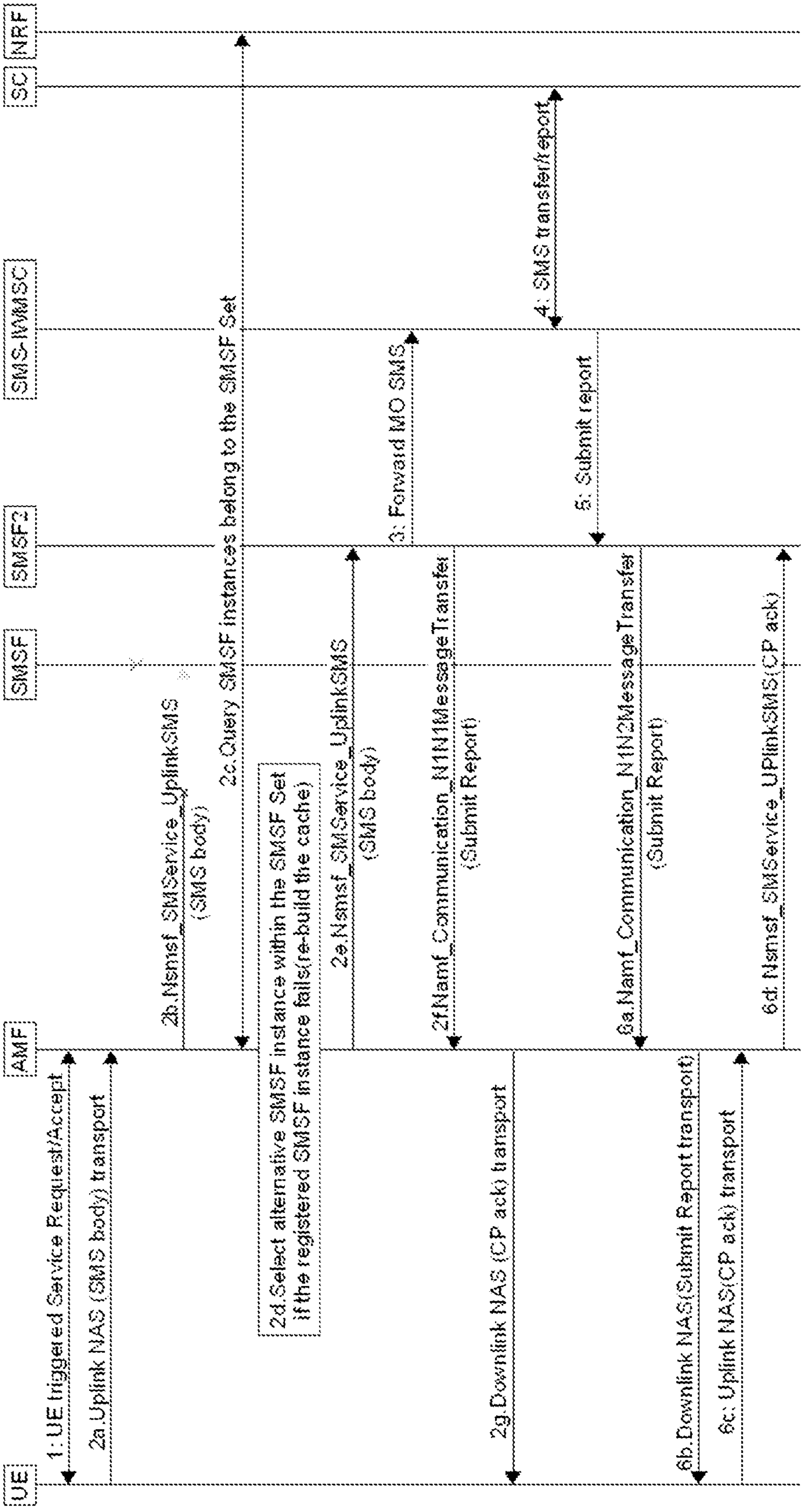
FIG. 9B schematically shows an exemplary signaling sequence of an exemplary scenario where the methods of FIGS. 6 and 7 according to the exemplary embodiment of the present disclosure have been applied in an exemplary SMS registration procedure.

Hereinafter, an exemplary signaling sequence diagram in another exemplary MO-SMS scenario where the methods 600 and 700 of FIGS. 6 and 7 according to the exemplary embodiment of the present disclosure are applied in the exemplary MO-SMS procedure will be described with reference to FIG. 9B, compared to an exemplary signaling sequence of a conventional MO-SMS procedure as shown in FIG. 9A.

It should be understood that although this exemplary scenario to which the methods 600 and 700 according to the embodiments of the present disclosure are applied involves the SMSF (as an NF service producer, which is an example of the third network node as previously described), the AMF (as an NF service consumer, which is an example of the first network node as previously described) and the UDM (as another NF service producer, which is an example of the second network node as previously described), the present disclosure is not limited to this. Any appropriate scenarios involving any appropriate NF service consumer (also called "first network node") and NF service producers (also called "second network node" and "third network node") are possible.

FIG. 9A schematically shows an exemplary signaling sequence of a conventional MO-SMS procedure without the methods 600 and 700 according to the embodiments of the present disclosure being applied (just for comparison with FIG. 9B in which the methods 600 and 700 according to the embodiments of the present disclosure are applied).

The conventional MO-SMS procedure as shown in FIG. 9A may include the following steps.

1. If a UE under Context Management (CM)-IDLE state is going to send an uplink SMS message, the UE and the network perform the UE Triggered Service Request procedure firstly as defined in 3GPP 23.502 V16.7.1, Clause 4.2.3.2 to establish an NAS signaling connection to the AMF.
2. The UE builds the SMS message to be sent. In particular,
2a. The UE sends the NAS message to the AMF.
2b. The AMF forwards the SMS message to the SMSF (SMSF1) serving the UE by invoking Nsmsf_SMService_UplinkSMS service operation. But the registered SMSF instance (SMSF1) fails to respond.
2c. If no cache or cache expired, the AMF may query from the NRF by the SMSF instance ID, and the NRF may send back the response for the NF profile of the SMSF instance, an SMSF Set ID of SMSF Set that the SMSF instance (SMSF1) belongs to could be included together.
2d. The AMF may query from the NRF to get all SMSF instances belong to the SMSF Set whose SMSF Set ID is got in step 2c.
2e. The AMF selects an alternative SMSF instance (for illustration, SMSF2 is the selected alternative SMSF instance in FIG. 9A) within the SMSF Set whose SMSF Set ID is got in step 2d, if the registered SMSF instance (SMSF1) fails. The AMF could rebuild the cache for the available SMSF instances of the SMSF set.
2f. The AMF forwards the SMS message to the re-selected SMSF (SMSF2) serving the UE by invoking Nsmsf_SMService_UplinkSMS service operation.
2g. The SMSF2 invokes Namf_Communication_N1N2MessageTransfer service operation to forward SMS ack message to the AMF.
2h. The AMF forwards the SMS ack message from the SMSF2 to the UE using downlink unit data message.
3. The SMSF2 forwards MO-SMS to SMS-Interworking Mobile Switching Center (IWMSC).
4. The SMS-IWMSC transfers SMS to SMS service center, and receives the submit report from SMS service center.
5. The SMS-IWMSC sends a submit report to the SMSF2.
6. The SMSF2 transports a submit report to the UE. In particular,
6a. The SMSF2 forwards the submit report to the AMF by invoking Namf_Communication_N1N2MessageTransfer service operation which is forwarded to the UE via Downlink NAS transport.
6b. The AMF sends downlink NAS to the UE for the submit report.
6c. The UE returns a CP-ack in the Uplink NAS transport.
6d. The AMF invokes an Nsmsf_SMService_UplinkSMS service operation to the SMSF2 for the CP ack.

FIG. 9B schematically shows an exemplary signaling sequence diagram in another exemplary MO-SMS scenario where the methods 600 and 700 of FIGS. 6 and 7 according to the exemplary embodiment of the present disclosure are applied in the exemplary MO-SMS procedure.

The exemplary MO-SMS procedure as shown in FIG. 9B in which the methods of FIGS. 6 and 7 according to the exemplary embodiment of the present disclosure are applied may include the following steps.

1. If a UE under CM-IDLE state is going to send an uplink SMS message, the UE and the network perform the UE Triggered Service Request procedure firstly as defined in 3GPP 23.502 V16.7.1, Clause 4.2.3.2 to establish an NAS signaling connection to the AMF.
2. The UE builds the SMS message to be sent. In particular,
2a. The UE sends the NAS message to the AMF.
2b. The AMF forwards the SMS message to the SMSF (SMSF1) serving the UE by invoking Nsmsf_SMService_UplinkSMS service operation. But the registered SMSF instance (SMSF1) fails to respond.
2c. If no cache or cache expired, the AMF may query from the NRF to get all SMSF instances belonging to the SMSF Set whose SMSF Set ID is got in step 7 of FIG. 8B, and the NRF may send back the response for the NF profiles of all SMSF instances.

The difference of the signaling sequence diagram in FIG. 9B from that in FIG. 9A is that the AMF already has the SMSF Set ID as step 5/7 in FIG. 8B, step 2c in FIG. 9B is saved to avoid additional signaling.

2d. The AMF selects an alternative SMSF instance (for illustration, SMSF2 is the selected alternative SMSF instance in FIG. 9B) within the SMSF Set whose SMSF Set ID is got in step 2c, if the registered SMSF instance (SMSF1) fails. The AMF could rebuild the cache for the available SMSF instances of the SMSF set.
2e. The AMF forwards the SMS message to the re-selected SMSF (SMSF2) serving the UE by invoking Nsmsf_SMService_UplinkSMS service operation.
2f. The SMSF2 invokes Namf_Communication_N1N2MessageTransfer service operation to forward SMS ack message to AMF.
2g. The AMF forwards the SMS ack message from the SMSF2 to the UE using downlink unit data message.
3. The SMSF2 forwards MO-SMS to SMS-IWMSC.
4. The SMS-IWMSC transfers SMS to SMS service center, and receives the submit report from SMS service center.
5. The SMS-IWMSC sends a submit report to the SMSF2.
6. The SMSF2 transports a submit report to the UE. In particular,
6a. The SMSF2 forwards the submit report to the AMF by invoking Namf_Communication_N1N2MessageTransfer service operation which is forwarded to the UE via Downlink NAS transport.
6b. The AMF sends downlink NAS to the UE for the submit report.
6c. The UE returns a CP-ack in the Uplink NAS transport.
6d. The AMF invokes Nsmsf_SMService_UplinkSMS service operation to SMSF2 for the CP ack.

It should be noted that the above two exemplary scenarios as shown in FIGS. 8B and 9B in which the methods 600 and 700 of the embodiments of the present disclosure are applied are only described for illustration but not for any limitation.

Any appropriate scenarios in which the methods 600 and 700 of the embodiments of the present disclosure can be applied fall into the scope of the present disclosure.

Figure 10:
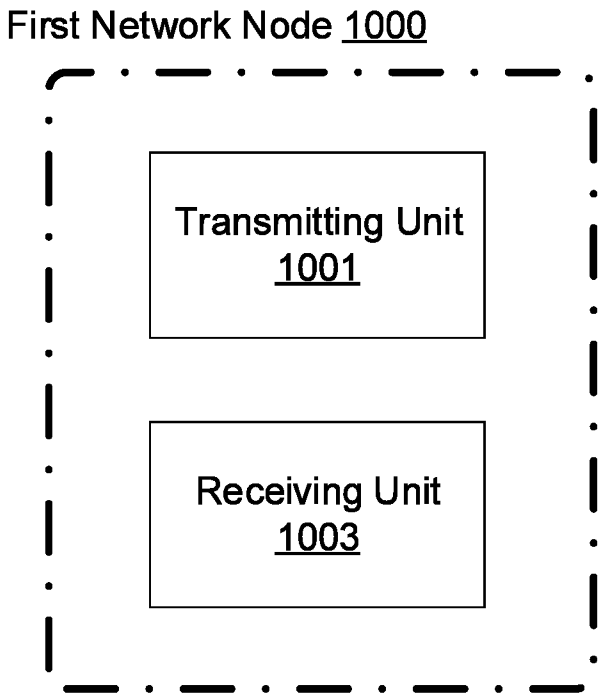
FIG. 10 schematically shows a structural block diagram of a first network node according to an exemplary embodiment of the present disclosure.

Hereinafter, a structure of a first network node according to an exemplary embodiment of the present disclosure will be described with reference to FIG. 10. FIG. 10 schematically shows a block diagram of the first network node 1000 according to an exemplary embodiment of the present disclosure. The first network node 1000 in FIG. 10 may perform the method 600 as described previously with reference to FIG. 6 which may be applied to the signaling sequence diagrams as shown in FIGS. 8B and 9B. Accordingly, some detailed description on the first network node 1000 may refer to the corresponding description of the method 600 in FIG. 6 and the signaling sequence diagrams of FIGS. 8B and 9B as previously discussed, and thus will be omitted here for simplicity.

As shown in FIG. 10, the first network node 1000 may include a transmitting unit 1001 and a receiving unit 1003.

The transmitting unit 1001 may be configured to transmit, to a second network node, a request message for a UE context of a third network node that is registered to the second network node.

The receiving unit 1003 may be configured to receive, from the second network node, a response message at least comprising the requested UE context of the third network node and set information of a set to which the third network node belongs.

The set consists of a plurality of network nodes including the third network node, and any context is shared by the plurality of network nodes belonging to the set.

The set information is received by the second network node in a registration request message of the third network node that is transmitted to the second network node.

The set information may implicitly indicate to the first network node that any of the plurality of network nodes belonging to the set can be used in a case where a failure occurs to the third network node.

The first network node 1000 may further include a querying unit (not shown), which may be configured to query the plurality of network nodes belonging to the set based on the received set information. The receiving unit 1003 may be further configured to receive information of the plurality of network nodes belonging to the set.

The first network node 1000 may further include a storage unit (not shown), which may be configured to store the information of the plurality of network nodes belonging to the set.

The first network node 1000 may further include a selection unit (not shown), which may be configured to select a network node from the plurality of network nodes belonging to the set based on the stored information of the plurality of network nodes belonging to the set, in a case where a failure occurs to the third network node.

Figure 11:
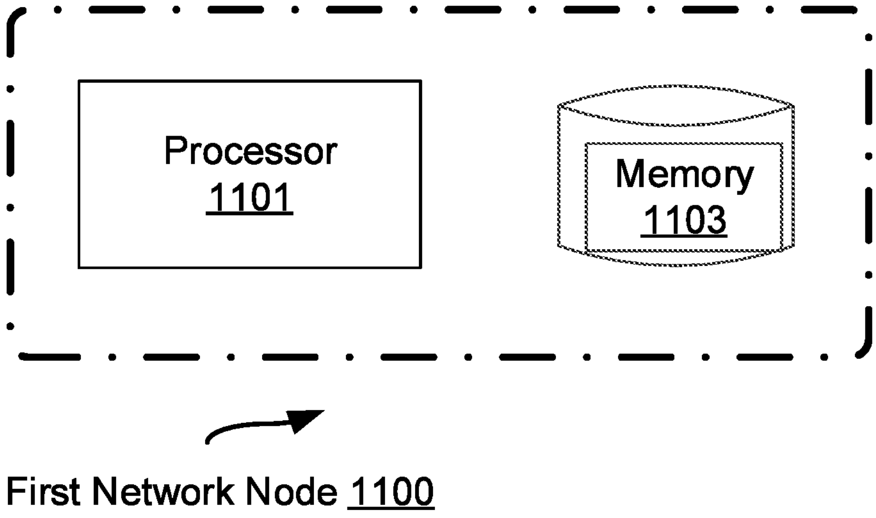
FIG. 11 schematically shows a structural block diagram of a first network node according to another exemplary embodiment of the present disclosure.

As shown in FIG. 11, the first network node 1100 includes at least one processor 1101 and at least one memory 1103. The at least one processor 1101 includes e.g., any suitable CPU (Central Processing Unit), microcontroller, DSP (Digital Signal Processor), etc., capable of executing computer program instructions.

The at least one memory 1103 may be any combination of a RAM (Random Access Memory) and a ROM (Read Only Memory). The at least one memory 1103 may also include persistent storage, which, for example, can be any single one or combination of magnetic memory, optical memory, or solid state memory or even remotely mounted memory.

The at least one memory 1103 stores instructions executable by the at least one processor 1101. The instructions, when loaded from the at least one memory 1103 and executed on the at least one processor 1101, may cause the first network node 1100 to perform the actions, e.g., of the procedures as described earlier respectively in conjunction with FIGS. 6, 8B and 9B, and thus will be omitted here for simplicity.

Figure 12:
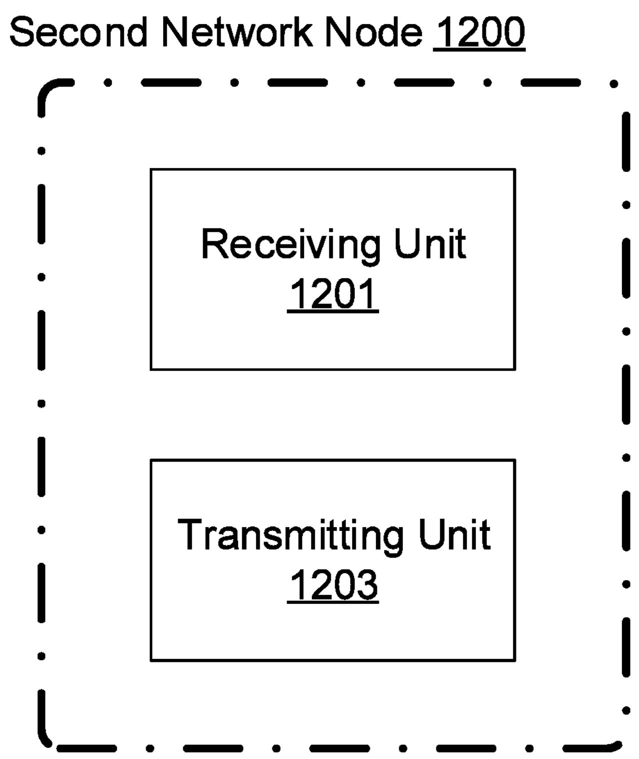
FIG. 12 schematically shows a structural block diagram of a second network node according to an exemplary embodiment of the present disclosure.

Hereinafter, a structure of a second network node according to an exemplary embodiment of the present disclosure will be described with reference to FIG. 12. FIG. 12 schematically shows a block diagram of the second network node 1200 according to an exemplary embodiment of the present disclosure. The second network node 1200 in FIG. 12 may perform the method 700 as described previously with reference to FIG. 7 which may be applied to the signaling sequence diagrams as shown in FIGS. 8B and 9B. Accordingly, some detailed description on the second network node 1200 may refer to the corresponding description of the method 700 in FIG. 7 and the signaling sequence diagrams of FIGS. 8B and 9B as previously discussed, and thus will be omitted here for simplicity.

As shown in FIG. 12, the second network node 1200 may include a receiving unit 1201 and a transmitting unit 1203.

The receiving unit 1201 may be configured to receive, from a third network node, a registration request message for registering the third network node to the second network node, wherein set information of a set to which the third network node belongs is included in the received registration request message.

The receiving unit 1201 may be further configured to receive, from a first network node, a request message for a UE context of a third network node that is registered to the second network node.

The transmitting unit 1203 may be configured to transmit, to the first network node, a response message at least comprising the requested UE context of the third network node and set information of a set to which the third network node belongs.

The set consists of a plurality of network nodes including the third network node, and any context is shared by the plurality of network nodes belonging to the set.

The set information may implicitly indicate to the first network node that any of the plurality of network nodes belonging to the set can be used in a case where a failure occurs to the third network node.

Figure 13:
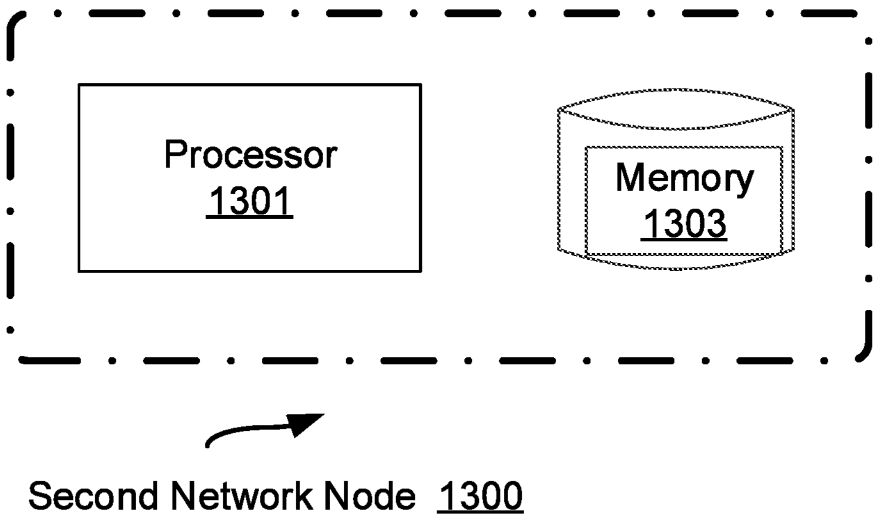
FIG. 13 schematically shows a structural block diagram of a second network node according to another exemplary embodiment of the present disclosure.

As shown in FIG. 13, the second network node 1300 includes at least one processor 1301 and at least one memory 1303. The at least one processor 1301 includes e.g., any suitable CPU (Central Processing Unit), microcontroller, DSP (Digital Signal Processor), etc., capable of executing computer program instructions. The at least one memory 1303 may be any combination of a RAM (Random Access Memory) and a ROM (Read Only Memory). The at least one memory 1303 may also include persistent storage, which, for example, can be any single one or combination of magnetic memory, optical memory, or solid state memory or even remotely mounted memory.

The at least one memory 1303 stores instructions executable by the at least one processor 1301. The instructions, when loaded from the at least one memory 1303 and executed on the at least one processor 1301, may cause the second network node 1300 to perform the actions, e.g., of the procedures as described earlier respectively in conjunction with FIGS. 7, 8B and 9B, and thus will be omitted here for simplicity.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program.

The computer program includes: code/computer readable instructions, which when executed by the at least one processor 1101 causes the first network node 1100 to perform the actions, e.g., of the procedure described earlier in conjunction with FIGS. 6, 8B and 9B; or code/computer readable instructions, which when executed by the at least one processor 1301 causes the second network node 1300 to perform the actions, e.g., of the procedures described earlier respectively in conjunction with FIGS. 7, 8B and 9B.

The computer program product may be configured as a computer program code structured in computer program modules. The computer program modules could essentially perform the actions of the flow illustrated in any of FIGS. 6, 7, 8B and 9B.

The processor may be a single CPU (Central processing unit), but could also include two or more processing units. For example, the processor may include general purpose microprocessors; instruction set processors and/or related chips sets and/or special purpose microprocessors such as Application Specific Integrated Circuit (ASICs). The processor may also include board memory for caching purposes. The computer program may be carried by a computer program product connected to the processor. The computer program product may include a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The present disclosure has been described above with reference to embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached.

The invention claimed is:

1. A method performed by a first network node comprising:

transmitting, to a second network node, a request message for a User Equipment 'UE' context of a third network node that is registered to the second network node; and receiving, from the second network node, a response message at least comprising the requested UE context of the third network node and set information of a set to which the third network node belongs.

2. The method of claim 1, wherein the set consists of a plurality of network nodes including the third network node, and any context is shared by the plurality of network nodes belonging to the set.

3. The method of claim 2, further comprising:

transmitting the received set information to a proxy for the proxy to query the plurality of network nodes belonging to the set based on the received set information, receive information of the plurality of network nodes belonging to the set, store the information of the plurality of network nodes belonging to the set, and select a network node from the plurality of network nodes belonging to the set based on the stored information of the plurality of network nodes belonging to the set, in a case where a failure occurs to the third network node.

4. The method of claim 1, wherein the set information indicates to the first network node that any of a plurality of network nodes belonging to the set can be used in a case where a failure occurs to the third network node.

5. The method of claim 1, further comprising:

querying a plurality of network nodes belonging to the set based on the received set information;

receiving information of the plurality of network nodes belonging to the set; and storing the information of the plurality of network nodes belonging to the set.

6. The method of claim 5, further comprising:

selecting a network node from the plurality of network nodes belonging to the set based on the stored information of the plurality of network nodes belonging to the set, in a case where a failure occurs to the third network node.

7. The method of claim 1, wherein the first network node is an Access and Mobility management Function 'AMF' or a Service Communication Proxy 'SCP', the second network node is a Unified Data Management 'UDM', and the third network node is a Short Message Service Function 'SMSF'.

8. The method of claim 7, wherein the request message is a HyperText Transfer Protocol 'HTTP' Get request message for UE-Context-In-SMSF Data, and the response message is a "200 OK" message comprising the UE-Context-In-SMSF Data, SMSF set information to which the SMSF belongs, and information of the SMSF.

9. A method performed by a second network node, comprising:

receiving, from a first network node, a request message for a User Equipment 'UE' context of a third network node that is registered to the second network node; and transmitting, to the first network node, a response message at least comprising the requested UE context of the third network node and set information of a set to which the third network node belongs.

10. The method of claim 9, wherein the set information indicates to the first network node that any of a plurality of network nodes belonging to the set can be used in a case where a failure occurs to the third network node.

11. The method of claim 9, wherein the first network node is an Access and Mobility management Function 'AMF' or a Service Communication Proxy 'SCP', the second network node is a Unified Data Management 'UDM', and the third network node is a Short Message Service Function 'SMSF'.

12. The method of claim 11, wherein the request message is a HyperText Transfer Protocol 'HTTP' Get request message for UE-Context-In-SMSF Data, and the response message is a "200 OK" message comprising the UE-Context-In-SMSF Data, SMSF set information to which the SMSF belongs, and information of the SMSF.

13. A first network node, comprising:

at least one processor, and at least one memory, storing instructions which, when executed on the at least one processor, cause the first network node to:

transmit, to a second network node, a request message for a User Equipment, UE, context of a third network node that is registered to the second network node; and receive, from the second network node, a response message at least comprising the requested UE context of the third network node and set information of a set to which the third network node belongs.

14. The first network node of claim 13, wherein the set consists of a plurality of network nodes including the third network node, and any context is shared by the plurality of network nodes belonging to the set.

15. A second network node, comprising:

at least one processor, and at least one memory, storing instructions which, when executed on the at least one processor, cause the second network node to:

receive, from a first network node, a request message for a User Equipment, UE, context of a third network node that is registered to the second network node; and transmit, to the first network node, a response message at least comprising the requested UE context of the third network node and set information of a set to which the third network node belongs.

16. The second network node of claim 15, wherein the set information indicates to the first network node that any of a plurality of network nodes belonging to the set can be used in a case where a failure occurs to the third network node.

17. A non-transitory computer readable storage medium having computer program instructions stored thereon, the computer program instructions, when executed by at least one processor, causing the at least one processor to perform the method according to claim 1.

* * * * *